(12) United States Patent
Huang et al.

(10) Patent No.: US 11,914,391 B2
(45) Date of Patent: Feb. 27, 2024

(54) CLEANING PARTITION PLANNING METHOD FOR ROBOT WALKING ALONG BOUNDRY, CHIP AND ROBOT

(71) Applicant: AMICRO SEMICONDUCTOR CO., LTD., Guangdong (CN)

(72) Inventors: Huibao Huang, Guangdong (CN); Hewen Zhou, Guangdong (CN); Zhuobiao Chen, Guangdong (CN)

(73) Assignee: AMICRO SEMICONDUCTOR CO., LTD., Zhuhai Guangdong (CN)

( * ) Notice: Subject to any disclaimer, the term of this patent is extended or adjusted under 35 U.S.C. 154(b) by 271 days.

(21) Appl. No.: 17/627,697

(22) PCT Filed: Nov. 24, 2020

(86) PCT No.: PCT/CN2020/131194
§ 371 (c)(1),
(2) Date: Jan. 17, 2022

(87) PCT Pub. No.: WO2021/248845
PCT Pub. Date: Dec. 16, 2021

(65) Prior Publication Data
US 2022/0244739 A1 Aug. 4, 2022

(30) Foreign Application Priority Data
Jun. 12, 2020 (CN) .......................... 202010537628.0

(51) Int. Cl.
*G05D 1/02* (2020.01)
*G05D 1/00* (2006.01)
(Continued)

(52) U.S. Cl.
CPC ........ *G05D 1/0248* (2013.01); *A47L 11/4011* (2013.01); *A47L 11/4061* (2013.01);
(Continued)

(58) Field of Classification Search
CPC ............... G05D 1/0248; G05D 1/0214; G05D 2201/0203; A47L 11/4011; A47L 11/4061; A47L 2201/04; B62D 57/032
See application file for complete search history.

(56) References Cited

U.S. PATENT DOCUMENTS 9,746,852 B1 * 8/2017 Watts .................... G05D 1/0248
9,840,003 B2 * 12/2017 Szatmary ............. B25J 11/0085
(Continued)

FOREIGN PATENT DOCUMENTS

CN 102890507 A 1/2013
CN 104035444 A 9/2014
(Continued)

OTHER PUBLICATIONS

Corresponding European search report dated Dec. 16, 2022.

*Primary Examiner* — Ramsey Refai
(74) *Attorney, Agent, or Firm* — Gang Yu

(57) ABSTRACT

The invention discloses a cleaning partition planning method for robot walking along the boundary, a chip and a robot. According to the cleaning partition planning method, a complete global map does not needed to be prestored in advance, but an initial room cleaning partition of the robot is divided in real time in a predefined cleaning area according to map image pixel information obtained by laser scanning in the process of walking along the boundary, meanwhile, the initial room cleaning partition of the robot is expanded by repeated iterative processing of the wall boundary of an uncleaned area in the same predefined cleaning area.

20 Claims, 5 Drawing Sheets

(51) Int. Cl.
  *A47L 11/40* (2006.01)
  *B62D 57/032* (2006.01)

(52) U.S. Cl.
  CPC ......... *B62D 57/032* (2013.01); *G05D 1/0214* (2013.01); *A47L 2201/04* (2013.01); *G05D 2201/0203* (2013.01)

(56) References Cited

U.S. PATENT DOCUMENTS

| | | | |
|---|---|---|---|
| 9,963,155 B2* | 5/2018 | Gariepy | G05D 1/0066 |
| 10,585,440 B1* | 3/2020 | Gariepy | B66F 9/24 |
| 10,982,456 B2* | 4/2021 | Witelson | E04H 4/1654 |
| 11,194,332 B2* | 12/2021 | Yoo | G05D 1/0276 |
| 2012/0101679 A1 | 4/2012 | Nderson et al. | |
| 2015/0039156 A1* | 2/2015 | Shibata | B60T 7/22 |
| | | | 701/1 |
| 2015/0253766 A1* | 9/2015 | Pettersson | G05B 19/41805 |
| | | | 700/168 |
| 2016/0375592 A1* | 12/2016 | Szatmary | B25J 9/1674 |
| | | | 700/250 |
| 2017/0072558 A1* | 3/2017 | Reynolds | G05D 1/024 |
| 2017/0225891 A1* | 8/2017 | Elazary | B65G 1/1375 |
| 2017/0344009 A1* | 11/2017 | Wernersbach | G05D 1/0011 |
| 2018/0224853 A1* | 8/2018 | Izhikevich | G05D 1/0234 |
| 2018/0224856 A1 | 8/2018 | Durvasula et al. | |

FOREIGN PATENT DOCUMENTS

| | | |
|---|---|---|
| CN | 108507578 A | 9/2018 |
| CN | 108567379 A | 9/2018 |
| CN | 109363585 A | 2/2019 |
| CN | 109464074 A | 3/2019 |
| CN | 109528090 A | 3/2019 |
| CN | 110597253 A | 12/2019 |
| CN | 111857127 A | 10/2020 |
| JP | 5158808 B2 | 3/2013 |

* cited by examiner

CLEANING PARTITION PLANNING METHOD FOR ROBOT WALKING ALONG BOUNDRY, CHIP AND ROBOT

CROSS REFERENCE TO RELATED APPLICATIONS

The present disclosure claims priority of Chinese Patent Application No. 2020105376280, filed on Jun. 12, 2020, entitled "Cleaning partition planning method for robot walking along boundry, chip and robot", the contents of which are hereby incorporated by reference in its entirety.

TECHNICAL FIELD

The invention relates to the technical field of path planning of robot laser data, and in particular to a cleaning partition planning method for robot walking along the boundary, a chip and a robot.

BACKGROUND

In a coverage cleaning working mode of a laser Simultaneous Localization And Mapping (SLAM) sweeper in the market at present, the sweeper performs cleaning operation according to a rectangular frame area with an M×N grid size (generally, a 4×4 grid size), after the currently framed M×N grid area is cleaned, another M×N grid area is expanded and framed, and cleaning is continued in the newly expanded area until all the working areas are covered. The working mode has the advantage that no prior map is needed, and the defects that the difference between the outline of the framed area and the actual terrain is large, so that the problems of more navigation paths, excessive small areas, too slow cleaning of the sweeper and the like are caused.

SUMMARY

In order to solve the technical problem, the invention provides a cleaning partition planning method for robot walking along the boundary, which is executed in the process of robot walking along the boundary and specifically includes the following steps: in S11, starting from a boundary walking starting point position of a robot, outline boundary line segments are located along coordinate axis directions of a laser map in a currently framed predefined cleaning area according to pixel point statistical information of a laser image scanned in each coordinate axis direction of the laser map, and the laser map is scanned and constructed in the process of robot walking along the boundary; in S12, the outline boundary line segment closest to a preset position is selected from each coordinate axis direction, and a rectangular initial room cleaning partition is defined; in S13, when the initial room cleaning partition does not belong to a preset room cleaning partition, a coordinate axis direction for preferential expanding is selected, a non-wall obstacle line segment in the initial room cleaning partition, which is vertically located in the coordinate axis direction for preferentially expanding are deleted, then the initial room cleaning partition is expanded along the same coordinate axis direction, and then the process proceeds to S14; in S14, whether an outline boundary line segment located in the coordinate axis direction for preferential expanding in S13 and adjacent to the non-wall obstacle line segment deleted in S13 is located in an uncleaned area in the currently framed predefined cleaning area or not is judged, whether the outline boundary line segment located in the coordinate axis direction intersects with the remaining outline boundary line segments of the initial room cleaning partition and no preset room cleaning partition is formed or not is judged, and if both two are met, the process returns to S13 for continuing expanding in the currently selected coordinate axis direction; otherwise, expanding in the currently selected coordinate axis direction in S13 is stopped, the process returns to S13, a coordinate axis direction with a lower expansion priority is selected for expanding, so that the predefined cleaning area is divided into the preset room cleaning partition by the corresponding outline boundary line segments; the non-wall obstacle line segment belongs to the outline boundary line segment but does not represent a wall, and the outline boundary line segments which define the preset room cleaning partition are superposed with an actual room boundary within a preset error allowable range; and the actual room boundary includes a boundary of obstacles inside the preset room cleaning partition and/or a boundary of obstacles inside an actual boundary area.

Furthermore, framing a predefined cleaning area by taking a planning starting point position as a center on the laser map scanned and constructed by the robot in real time, then selecting a boundary walking starting point position of a physical boundary closest to the currently framed predefined cleaning area, and controlling the robot to advance from the boundary walking starting point position to the physical boundary along a straight-line planning path until the robot is configured to walk along the physical boundary; wherein the physical boundary comprises a boundary of obstacles or wall within the predefined cleaning area; and the planning starting point position is a starting position of the robot within the currently framed predefined cleaning area.

Furthermore, when it is detected that the preset room cleaning partition conforming to the requirements is divided from the currently framed predefined cleaning area, controlling the robot to continue to walk along a boundary in the divided preset room cleaning partition, and when the robot finishes one round along the preset room cleaning partition and returns to the planning starting point position, controlling the robot to start to perform planned cleaning on the preset room cleaning partition, wherein the preset room cleaning partition surrounds the planning starting point position, a walking path of the robot from the planning starting point position to the boundary walking starting point position, and boundary path the robot has walked.

Furthermore, in the process of the robot walking along the boundary, when the robot divides one preset room cleaning partition, if it is judged that the robot has walked out of the preset room cleaning partition divided at the boundary walking starting point position in a manner of along the boundary, controlling the robot to continue to divide a new preset room cleaning partition, then combining two preset room cleaning partitions, then controlling the robot to continue to walk along a boundary in a combined preset room cleaning partition, when the robot finishes one round along the boundary and returns to the planning starting point position, controlling the robot to perform planned cleaning on the combined preset room cleaning partition, wherein the combined preset room cleaning partition surrounds the planning starting position, a walking path of the robot from the planning starting point position to boundary walking starting point position, and the boundary path the robot has walked.

Furthermore, the robot is controlled not to cross the preset room cleaning partition in the process of executing the planned cleaning until the preset room cleaning partition is covered by a planned cleaning path, and then area covered by the robot cleaning is marked as a cleaned area, and meanwhile, scanned area outside the area covered by the robot cleaning is marked as an uncleaned area.

Furthermore, the predefined cleaning area is a square block area with the planning starting point position as a diagonal intersection point, and is configured to limit a range of the robot walking along the boundary, so as to surround a preset room cleaning partition determined at current time or a preset room cleaning partitions combined in the same predefined cleaning area; and a coverage area of the predefined cleaning area is equivalent to a square actual physical area, and side length of the square actual physical area is related to size of an area to be cleaned in a room.

Furthermore, the specific judgment method of the preset room cleaning partition comprises: when the outline boundary line segments which define the initial room cleaning partition are not non-wall obstacle line segments, and length of the isolated obstacle line segments in the initial room cleaning partition is smaller than a relatively small value in length of the line segment corresponding to the number of the pixel points of the wall fitting quantity value and the preset ratio of length of any side of the initial room cleaning partition, determining that the initial room cleaning partition belongs to the preset room cleaning partition; when one of the outline boundary line segments which define the initial room cleaning partition is a non-wall obstacle line segment, or the length of the isolated obstacle line segment inside the initial room cleaning partition is greater than or equal to the length of the line segment corresponding to the number of the pixel points of the wall fitting quantity value, or the length of the isolated obstacle line segment inside the initial room cleaning partition is greater than or equal to a preset ratio of the length of one side of the initial room cleaning partition, determining that the initial room cleaning partition does not belong to the preset room cleaning partition; wherein the outline boundary line segments are divided into non-wall obstacle line segments and wall obstacle line segments according to the number of white pixel points, the number of the white pixel points in the non-wall obstacle line segments is greater than or equal to a preset threshold value, and the number of the white pixel points in the wall obstacle line segments is smaller than the preset threshold value; and wherein isolated obstacle line segments scanned also exist in the laser map, when the length of the isolated obstacle line segment is greater than or equal to one of the preset error ratio of length of one side of the initial room cleaning partition and the length of the line segment corresponding to the number of the pixel points of the wall fitting number value, the isolated obstacle line segment is marked as the wall obstacle line segment.

Furthermore, the specific method of S11 comprises: counting image pixel points of the laser map currently constructed from the planning starting point position in the predefined cleaning area; when it is counted that the number of black pixel points with same vertical coordinate exceeds a preset boundary threshold value in the X-axis direction, marking the outline boundary line segments formed by connection of the black pixel points with the same vertical coordinate, so that area extending in the X-axis direction in the predefined cleaning area is divided by the corresponding outline boundary line segments; and when it is counted that the number of black pixel points with same horizontal coordinate exceeds a preset boundary threshold value in the Y-axis direction, marking the outline boundary line segments formed by connection of the black pixel points with the same vertical coordinate, so that area extending in the Y-axis direction in the predefined cleaning area is divided by the corresponding outline boundary line segments.

The invention also provides a chip, which is internally provided with a control program, and the control program is configured to control a mobile robot to execute the cleaning partition planning method.

The invention also provides a robot, which is provided with a laser sensor, and the robot is internally provided with the chip for configuring the robot to divide the preset room cleaning partition in the process of walking along the boundary.

Compared with a relevant art, in the solution, a complete global map does not needed to be prestored in advance, but the initial room cleaning partition of the robot is divided in real time in the predefined cleaning area according to map image pixel information obtained by laser scanning in the process of walking along the boundary, meanwhile, the initial room cleaning partition of the robot is expanded by repeated iteration processing of the wall boundary of the uncleaned area in the same predefined cleaning area.

DETAILED DESCRIPTION OF THE EMBODIMENTS

Figure 1:
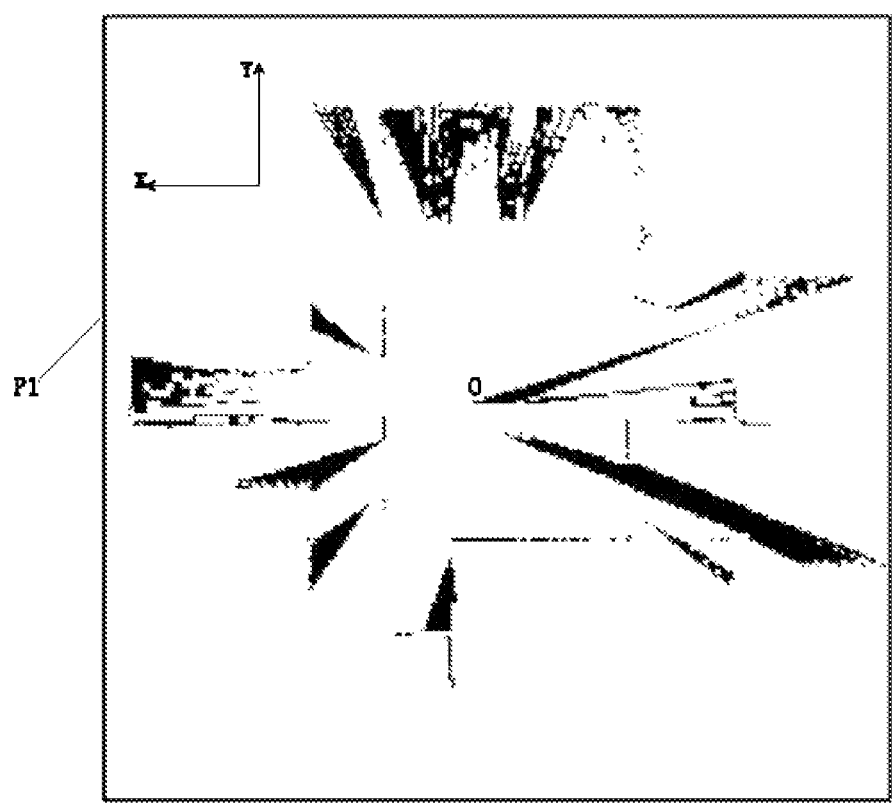
FIG. 1 is an effect diagram of a predefined cleaning area P1 framed on a scanned and constructed grayscaled laser map when a robot moves to a planning starting point position O.

The technical solutions in the embodiments of the invention will be described in detail below with reference to the accompanying drawings in the embodiments of the invention. The accompanying drawings are provided for further illustrating the embodiments. The accompanying drawings, which are incorporated in and constitute a part of the invention, mainly illustrate the embodiments, together with the description of the specification, serve to explain the principles of the embodiments. With these references, those of ordinary skill in the art will appreciate other possible implementation modes and advantages of the invention. The image size of a laser map in the drawings is not drawn to scale. According to a method provided by the embodiment of the invention, a main execution body of a program is a laser navigation robot, the laser navigation robot can be provided with a laser sensor, the laser sensor can detect obstacles, and in a general scene, the laser navigation robot can detect whether obstacles exist around or not through the laser sensor arranged on the laser navigation robot and mark the obstacles on the laser map in real time in an indoor moving process.

Figure 5:
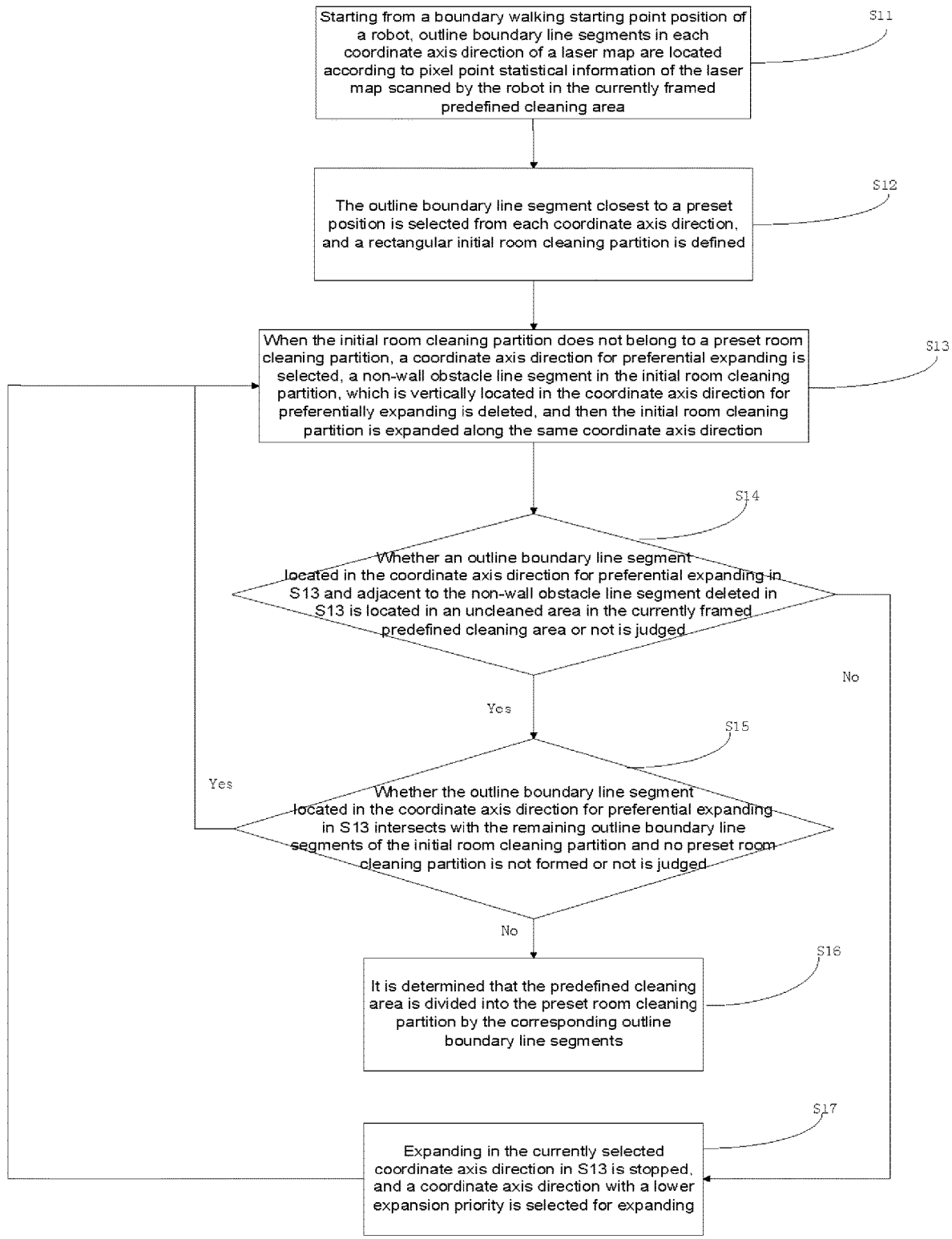
FIG. 5 is a flowchart of a cleaning partition planning method for robot walking along the boundary according to an embodiment of the invention.

As a specific embodiment, the invention discloses a cleaning partition planning method for robot walking along the boundary, which is executed in the process of robot walking along the boundary, and as shown in FIG. 5, the method specifically includes the following steps.

In S11, starting from a boundary walking starting point position of the robot, outline boundary line segments in each coordinate axis direction of a laser map are located according to pixel point statistical information of the laser map scanned by the robot in a currently framed predefined cleaning area, and then the process proceeds to S12; the laser map is scanned and constructed in the process of robot walking along the boundary; the specific method of S11 includes: image pixel points of the currently constructed laser map are counted from a planning starting point position in the predefined cleaning area, the outline boundary line segments are located in the coordinate axis directions in the predefined cleaning area, and the coordinate axis directions include the X-axis direction and the Y-axis direction as shown in the figure. In the embodiment, the number of various gray-level pixel points in detection intervals with different distances from the planning starting point are counted by utilizing a histogram of obstacles, and locating of obstacle line segments formed by the pixel points of the corresponding gray levels on the laser map is also realized. When it is counted that the number of black pixel points with the same vertical coordinate exceeds a preset boundary threshold value along the X-axis direction, the outline boundary line segments formed by connection of the black pixel points with the same vertical coordinate are marked, so that the area extending along the X-axis direction in the predefined cleaning area is divided by the corresponding outline boundary line segments; actually, the subsequent steps can judge that the outline boundary line segments are not a wall and are deleted, then the corresponding divided areas are combined to avoid excessive area dividing, but the outline characteristics of the local area in the X-axis direction still can be described; and when it is counted that the number of the black pixel points with the same vertical coordinate does not exceed the preset boundary threshold value along the X-axis direction, the outline boundary line segments are not marked along the current direction. When it is counted that the number of black pixel points with the same horizontal coordinate exceeds a preset boundary threshold value along the Y-axis direction, the outline boundary line segments formed by connection of the black pixel points with the same horizontal coordinate are marked, so that the area extending along the Y-axis direction in the predefined cleaning area is divided by the corresponding outline boundary line segments, otherwise, the outline boundary line segments are not marked along the current direction, the outline characteristics of the local area in the Y-axis direction are described, the subsequent steps can judge that the outline boundary line segments determined in the direction are not a wall and can not play a role of area dividing, and a next outline boundary line segment needs to be continuously searched to approximate the size of the boundary of the wall to define a cleaning partition in the predefined cleaning area. It is to be noted that the outline boundary line segment is related to the body size of the robot and the side length of the predefined cleaning area, and can be adjusted according to actual needs. In the implementation mode, according to the number of the black pixel points distributed in the same coordinate axis direction, the area with certain trafficability is selected in the predefined cleaning area, the outline boundary line segments are marked, the outline boundary line segments which define the cleaning partition can be mutually aligned to enable the room area division to be more regular and reasonable, and it is also ensured that the marked outline boundary line segments can frame a rectangular working area for the robot to continuously walk along the boundary.

In S12, the outline boundary line segment closest to a preset position is selected from each coordinate axis direction, a rectangular initial room cleaning partition is defined, and then the process proceeds to S13. In the embodiment, the initial room cleaning partition belongs to a portion of the rectangular area of the room cleaning partition #1 shown in FIG. 2.

In S13, when the initial room cleaning partition does not belong to a preset room cleaning partition, a coordinate axis direction (such as the negative Y-axis direction) for preferential expanding is selected, a non-wall obstacle line segment in the initial room cleaning partition, which is vertically located in the coordinate axis direction for preferential expanding is deleted, the initial room cleaning partition is expanded along the same coordinate axis direction, and then the process proceeds to S14.

In S14, whether an outline boundary line segment located in the coordinate axis direction for preferential expanding in S13 and adjacent to the non-wall obstacle line segment deleted in S13 is located in an uncleaned area in the currently framed predefined cleaning area or not is judged, if yes, the process proceeds to S15, otherwise, the process proceeds to S17. The step is configured to limit the expansion range of the outline boundary line segments in the coordinate axis direction for preferential expanding so as to avoid that the cleaning partition framed by the outline boundary line segments has more overlapping areas with a cleaned area or an unknown area.

In S15, whether the outline boundary line segment located in the coordinate axis direction for preferential expanding in S13 intersects with the remaining outline boundary line segments of the initial room cleaning partition and no preset room cleaning partition is not formed or not is judged, yes so, the process returns to S13, that is, it means that the judgment conditions of S14 and S15 are both met, the process returns to S13 for continuing expanding in the currently selected coordinate axis direction; otherwise, the process proceeds to S16.

In S16, it is determined that the predefined cleaning area is divided into the preset room cleaning partition by the corresponding outline boundary line segments, and further expanding in the original predefined cleaning area is not needed.

In S17, expanding in the currently selected coordinate axis direction in S13 is stopped, the process returns to S13, a coordinate axis direction with a lower expansion priority (such as the negative X-axis direction) is selected for expanding, and the predefined cleaning area is divided into the preset room cleaning partition by corresponding outline boundary line segments by repeating the previous step. In the previous step, the non-wall obstacle line segment belongs to an outline boundary line segment but does not represent a wall, and the outline boundary line segments which define the preset room cleaning partition are superposed with the actual room boundary within a preset error allowable range; and the actual room boundary includes a boundary of obstacles inside the preset room cleaning partition and/or a boundary of obstacles inside an actual boundary area.

Figure 2:
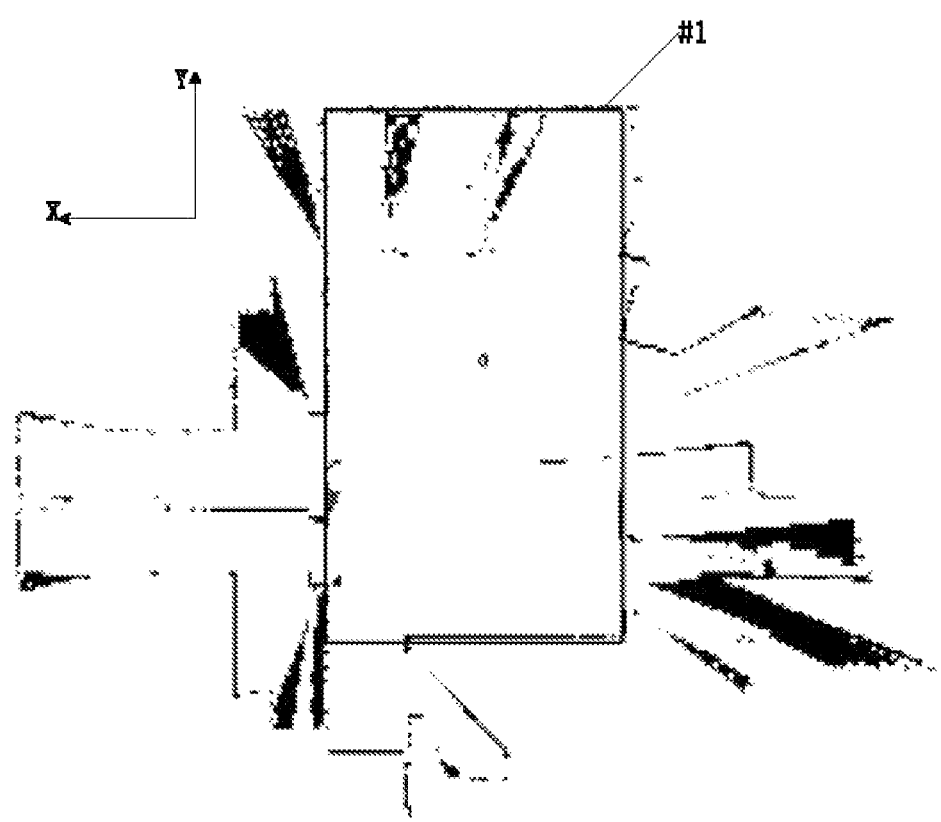
FIG. 2 is an effect diagram of a preset room cleaning partition #1 divided from a predefined cleaning area P1 by a robot during the process of walking along the boundary.

The box boundary of the room cleaning partition #1 in FIG. 2 is close to the wall boundary of the actual environment, that is, the preset room cleaning partition #1 divided in the predefined cleaning area P1 and the preset room cleaning partition #2 divided in the predefined cleaning area P2 are both close to the terrain of an actual room; the non-wall obstacle line segment is an outline boundary line segment which does not belong to a wall, the outline boundary line segments which define the preset room cleaning partition are superposed with the actual room boundary within a preset error allowable range; and the actual room boundary includes a boundary of obstacles inside the preset room cleaning partition and/or a boundary of obstacles inside an actual boundary area, and the actual room is an actual physical area where the predefined cleaning area is located. Compared with a relevant art, in the embodiment, the initial room cleaning partition of the robot is divided in real time in the predefined cleaning area according to map image pixel information obtained by laser scanning, the initial room cleaning partition of the robot is expanded by repeated iterative processing of the wall boundary of the uncleaned area in the same predefined cleaning area, so that it is ensured that the outline boundary of the room cleaning partition finally formed in the same predefined cleaning area is similar to the actual room boundary. In the embodiment, the initial working area is expanded into the closed box areas #1 and #2 with larger area and wider coverage.

As a specific embodiment, the cleaning partition planning method further includes: after the robot is started to start area planning, a predefined cleaning area is framed by taking a planning starting point position of the robot as a center on a laser map scanned and constructed by the robot in real time, and the planning starting point position is a starting position of the robot in the currently framed predefined cleaning area. As shown in FIG. 1, the currently framed predefined cleaning area is a square box area defined by the robot at the starting position O (current planning starting point position) and having the starting position O as a diagonal intersection point, and configured to limit the range of robot walking along the boundary and the constructed outline boundary line segments, and the square box area is a square box with an actual side length of 12 meters; it is worth noting that the predefined cleaning area, although a closed area, is not all detected and scanned by the laser sensor on the robot; and in the process of robot walking along the boundary in the currently framed predefined cleaning area, the robot keeps not crossing the currently framed predefined cleaning area, which is equivalent to not crossing the square actual physical area with the side length of 12 meters.

A boundary walking starting point position of the closest physical boundary is selected in the predefined cleaning area framed at the current planning starting point position, and the robot is controlled to advance from the planning starting point position to the physical boundary along a straight-line planning path until the robot is configured to walk along the physical boundary; and then the process proceeds to S3. In the step, the motion state that the robot is configured to walk along the physical boundary is: the robot is controlled to walk along the physical boundary where the boundary walking starting point position is located from the boundary walking starting point position closest to the planning starting point position in the currently framed predefined cleaning area, the direction of walking along the boundary is not limited, the physical boundary includes the boundary of obstacles or a wall in the currently framed predefined cleaning area, so that the walking mode along the boundary can be started only if the boundary of the obstacles or the wall is detected in the process that the robot advances along the straight-line planning path.

As an embodiment, when it is detected that a preset room cleaning partition conforming to the requirements is divided from the currently framed predefined cleaning area, the robot is controlled to continue to walk along the boundary in the divided preset room cleaning partition, and when the robot finishes one round along the preset room cleaning partition and returns to the planning starting point position, the robot is controlled to start to perform planned cleaning on the preset room cleaning partition, and the preset room cleaning partition surrounds the planning starting point position, the walking path of the robot from the planning starting position to boundary walking starting, and the boundary path the robot has walked. In the process that the robot walks along the boundary in the currently framed predefined cleaning area, if obstacles or a wall is detected, the robot continues to walk along the boundary of the obstacles or the wall detected currently, and meanwhile, the position and the shape of the obstacles or the wall along which the robot walks are marked, but the robot does not stop waiting for map generation or room area division. It is to be noted that regardless of whether the robot walks along the boundary or not, if the obstacles or the wall is detected, the robot continues to walk along the boundary of the obstacles or the wall detected currently, and meanwhile, the position and the shape of the obstacles or the wall along which the robot walks are marked. Therefore, the actual boundary of the room is determined through walking along the boundary, so that the boundary for current walking along the boundary is consistent with the boundary of the room cleaning partition divided subsequently, and the marked obstacles can be favorably bypassed in the subsequent cleaning process in the same area. Compared with a relevant art, in the embodiment, the preset room cleaning partition is divided in real time in the process of walking along the boundary, so that the cleaning area matched with the boundary of the actual room environment is selected for the operation of first walking along the boundary and then cleaning, and long-time walking along the boundary without cleaning can be avoided.

Figure 3:
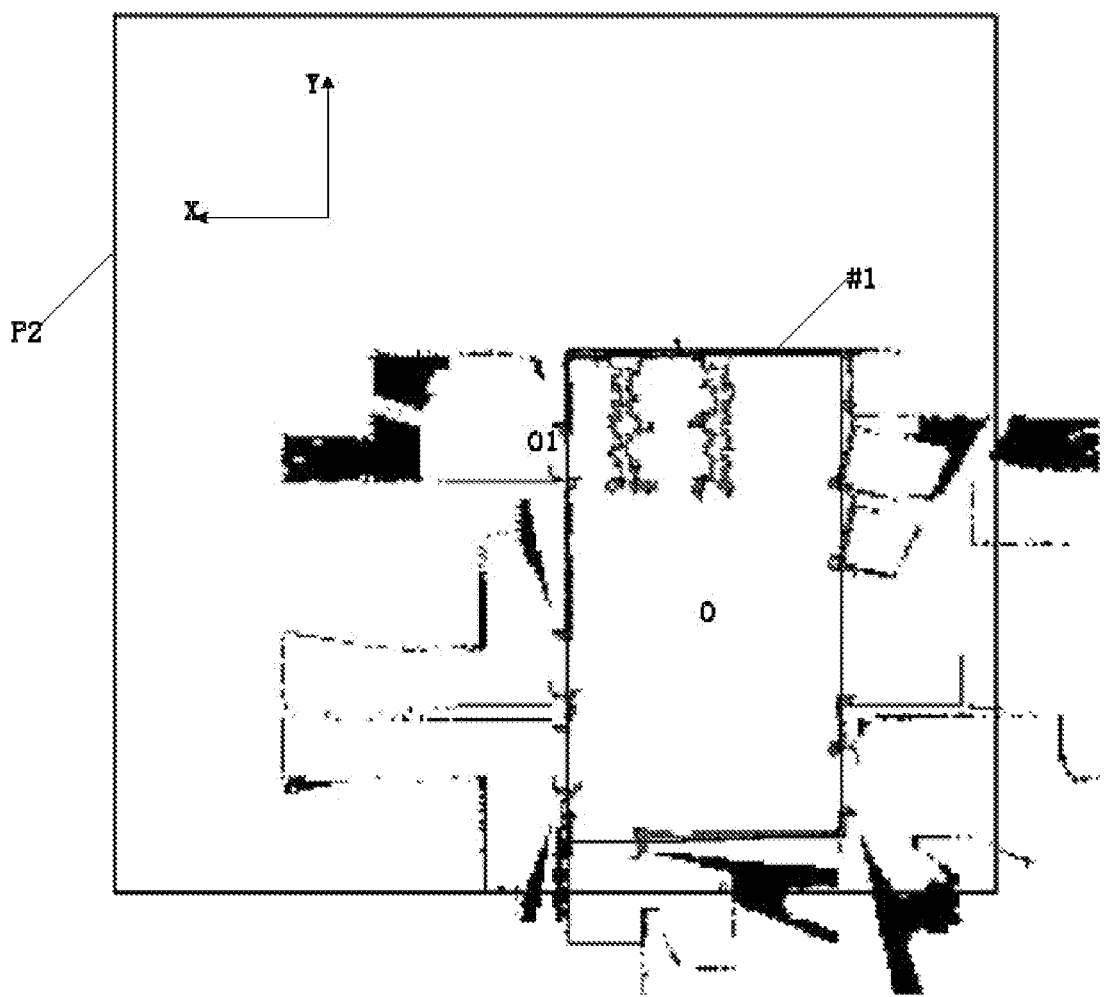
FIG. 3 is an effect diagram of a predefined cleaning area P2 framed on a scanned and constructed grayscaled laser map when a robot moves to a planning starting point position O1.

It is to be noted that when the subsequent planning starting point position changes, such as the planning starting point position O of FIG. 1 changes to the position O1 of FIG. 3, the coverage area position of the predefined cleaning area also changes, as shown by the square box area of FIG. 3 with the position O1 as the diagonal intersection point. In the embodiment, a rectangular area for limiting the range of walking the boundary is correspondingly set for each planning starting point position, for framing the maximum range of walking along the boundary of the robot in advance and laying out the outline boundary line segments in each coordinate axis direction.

As an embodiment, in the process of the robot walking along the boundary, when the robot divides one preset room cleaning partition at the original position, because the speed of the robot walking along the boundary is high, the robot does not waits for division of the preset room cleaning partition and map generation in the process of walking along the boundary, therefore it is judged that the robot has walked out of the preset room cleaning partition conforming to the requirements divided at the original position in a manner of along the boundary, then the robot is controlled to continue to divide a new preset room cleaning partition at a new position, then the two preset room cleaning partitions are combined, the robot is supported to walk along the boundary to return to the planning starting point position, in particular, the robot walks along the boundary out the gap of the currently divided preset room cleaning partition, and has no time to walk along the boundary in the currently divided preset room cleaning partition but enter an uncleaned area, the original position in the embodiment can be the boundary walking starting point position of S11, and when the robot walks along the boundary to a new preset room cleaning partition conforming to the requirements, the robot can continue to return to the planning starting point position through walking along the boundary. Then the robot is controlled to continue to walk along the boundary in combined preset room cleaning partition, when the robot finishes one round along the boundary and returns to the planning starting point position, the robot is controlled to start to perform planned cleaning on the combined preset room cleaning partition, and the combined preset room cleaning partition surround the planning starting point position, the walking path of the robot from the planning starting position to boundary walking starting, and the boundary path the robot has walked. It is to be noted that the robot executes the partition calculation of the room cleaning partition while executing the walking along the boundary, so that the robot smoothly executes the walking along the boundary and cleaning in the currently framed predefined cleaning area, the phenomenon of machine pause seldom occurs, the boundary of walking along the boundary of the robot is consistent with the actual environment boundary corresponding to the currently framed predefined cleaning area.

Preferably, the robot is controlled not to cross the preset room cleaning partition in the process of executing planned cleaning until the preset room cleaning partition is covered by the planned cleaning path, and then the area covered by the robot cleaning is marked as a cleaned area, and meanwhile, the scanned area outside the area covered by the robot cleaning is marked as the uncleaned area. Specifically, when the robot completes the planned cleaning of the preset room cleaning partition determined at the current time, the cleaned area and the uncleaned area are distinguished according to the position information marked by the robot, that is, the preset room cleaning partition covered by the robot using the planned cleaning path is all detected as the cleaned area, and other known areas (including the uncleaned area which has been scanned and marked) are all detected as the uncleaned areas. The robot scans and constructs the preset room cleaning partition to mark the cleaned area in the process of performing Chinese-character 'Gong'-shaped planned cleaning. So that the robot is reminded not to repeatedly clean the cleaned area. Therefore, the cleaned area and the non-cleaned area can be accurately distinguished in the predefined cleaning area, which is beneficial for realizing comprehensive coverage of the area to be cleaned.

In the foregoing embodiment, the predefined cleaning area is a square block area with the planning starting point position as a diagonal intersection point, and is configured to limit the range of robot walking along the boundary, so as to surround the preset room cleaning partition determined at the current time or the preset room cleaning partitions combined in the same predefined cleaning area; and the coverage area of the predefined cleaning area is equivalent to the square actual physical area, and the side length of the square actual physical area is related to the size of the area to be cleaned in the room. According to the technical solution, a rectangular area for limiting the boundary range is correspondingly arranged for each planning starting point position, for framing the area range of the preset room cleaning partition planned by the robot in advance, and also preventing the robot from walking along the boundary endlessly.

It is to be noted that the coverage area of the predefined cleaning area is equivalent to the square actual physical area with the side length of 12 meters, and the coverage area position of the predefined cleaning area changes with the change of the planned starting point position of the robot. In the foregoing embodiment, a rectangular area for limiting the boundary range is correspondingly arranged for each planning starting point position, for framing the maximum boundary range of the robot in advance, and also preventing the robot from walking along the boundary endlessly. As can be seen from FIGS. 1 and 2, the robot scans and divides the preset room cleaning partition #1 shown in FIG. 2 at the planning starting point position O in the predefined cleaning area P1 shown in FIG. 1, the planning starting point position O is also located inside the preset room cleaning partition #1, and the predefined cleaning area P1 is a square box area with the planning starting point position O as a diagonal intersection point, and is configured to surround the preset room cleaning partition #1 to limit the range of the robot walking along the boundary. In the embodiment, after the preset room cleaning partition is divided from the currently framed predefined cleaning area, the robot is controlled to walk along the boundary in the matched area, and when the robot completes a round in the matched area and returns to the planning starting point position, the robot is controlled to perform planned cleaning in the matched area.

Preferably, on the laser map scanned and constructed in real-time by the robot, a new predefined cleaning area is framed by taking a next planning starting point position as a center, a boundary walking starting point position of the physical boundary closest to the new predefined cleaning area is selected, and the robot is controlled to advance from the boundary walking starting point position to the physical boundary along the straight-line planning path until the robot is configured to walk along the physical boundary; the physical boundary includes a boundary of obstacles or a wall within the new predefined cleaning area; and the next planning starting point position is the starting position of the robot within the new predefined cleaning area. When the robot walks along the boundary within the new predefined cleaning area, the steps of the previous embodiment are performed to plan a new preset room cleaning partition within the new predefined cleaning area. The robot is controlled to bypass the distinguished cleaned area in the processes of performing planned cleaning and walking along the boundary, including the cleaned area marked in the last walking process along the boundary; the next planning starting point position is the position which is closest to the position where the robot finishes planned cleaning currently in the non-cleaned area, the next planning starting point position needs to depend on the straight line planning navigation of the robot from the position which finishes planned cleaning currently, and in the walking process of the robot, if obstacles or a wall is detected, the robot continues to walk along the boundary of the obstacles or the wall detected currently until the next planning starting point position is navigated. In the embodiment, the new predefined cleaning area is framed by the next planning starting point position, so that a sufficient number of unknown map areas can be scanned in the subsequent boundary process, more room cleaning partitions or actual boundary areas can be framed, and walking along the boundary is performed by bypassing the cleaned areas, so that unnecessary navigation paths are reduced.

Specifically, as can be seen from a comparison between FIG. 2 and FIG. 3, after the robot completes the Chinese-character 'Gong'-shaped planned cleaning of the preset room cleaning partition #1 scanned and divided within the predefined cleaning area P1 of FIG. 1, the preset room cleaning partition #1 of FIG. 2 is marked as a cleaned area, while the map areas outside the box of the preset room cleaning partition #1 of FIG. 2 and FIG. 3 is marked as an uncleaned area, and the preset room cleaning partition #1 of FIG. 2 is marked with more information than the same area of FIG. 1. The robot is then controlled to move to the planned starting point position O1 (equivalent to the next planning starting point position in the above embodiment) belonging to the uncleaned area shown in FIG. 3, and a new predefined cleaning area is farmed by using the planning starting position O1 as the diagonal intersection point, as shown by the square box P2 in FIG. 3.

As can be seen from a comparison between the laser maps scanned in FIGS. 1, 2 and 3, the planning starting point position O1 in FIG. 3 is located at the upper left of the planning starting point position O in FIG. 1, the planning starting point position O1 in FIG. 3 is still located in the scanned known laser map area, and belongs to the uncleaned area in the embodiment shown in FIG. 3, and the planning starting point position O1 is closest to the position finishing cleaning of the preset room cleaning partition #1 in FIG. 3. The predefined cleaning area P2 of FIG. 3 is shifted to the upper left with respect to the predefined cleaning area P1 of FIG. 1 with the same size, so that the predefined cleaning area P2 of FIG. 3 scans an environmental area not scanned by the predefined cleaning area P1 of FIG. 1, and then the robot can scan and construct in the predefined room cleaning partition divided by the predefined cleaning area P2 to obtain a predefined room cleaning partition #4 of FIG. 4, and more practical wall areas are planned for the laser map constructed in real time, however, the two predefined cleaning areas distributed in different area coverage areas, namely, the predefined cleaning area P2 and the predefined cleaning area P1, are both configured to limit the range of the robot walking along the boundary. Meanwhile, the predefined cleaning area P2 of FIG. 3 surrounds the preset room cleaning partition #1 marked as the cleaned area in FIG. 3, so that there is an overlapping area of the predefined cleaning area P2 and the predefined cleaning area P1 of FIG. 1, which overlapping area includes the preset room cleaning partition #1; and within the subsequent predefined cleaning area P2, no overlapping area occurs with the preset room cleaning partition #1, which is marked as the cleaned area, based on the preset room cleaning partition extended by the boundary outline line segments in the direction for preferential expanding.

Figure 4:
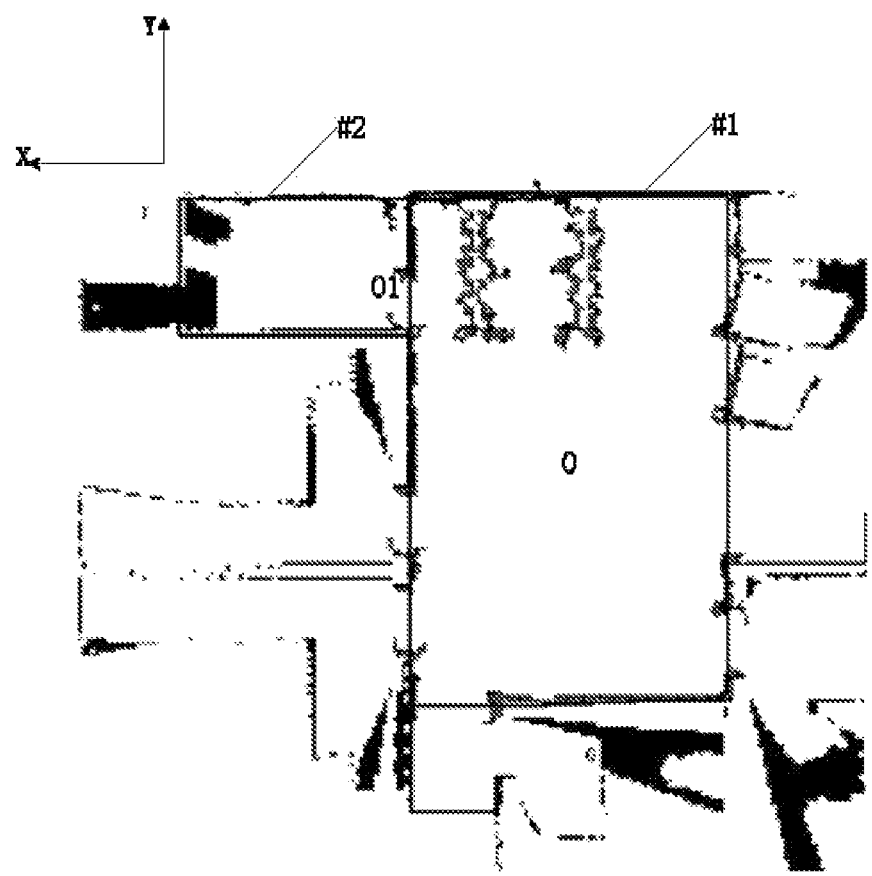
FIG. 4 is an effect diagram of a preset room cleaning partition #2 divided from a predefined cleaning area P2 by a robot during the process of walking along the boundary, and the preset room cleaning partition #1 and the preset room cleaning partition #2 are adjacent on a laser map.

As can be seen from a comparison between FIG. 3 and FIG. 4, when the robot scans and divides the preset room cleaning partition #2 shown in FIG. 4 at the planning starting point position O1 shown in FIG. 3, more map information is marked in the preset room cleaning partition #2 of FIG. 4 than in the same area of FIG. 3; and the planning starting point position O1 is also located inside the preset room cleaning partition #2, and the predefined cleaning area P2 surrounds the preset room cleaning partition #2. The preset room cleaning partition #2 in FIG. 4 is just adjacent to the preset room cleaning partition #1 in FIG. 4, and the two preset room cleaning partitions can be regarded as having no overlapping area, so that the robot can bypass the preset room cleaning partition #1 when performing walking along the boundary and Chinese-character 'Gong'-shaped planned cleaning in the preset room cleaning partition #2, the cleaned area is prevented from being repeatedly cleaned, the cleaning time is shortened, and the cleaning efficiency of the robot is improved. Meanwhile, the preset room cleaning partitions #1 and #2 which are divided successively have an adjacent relation, namely the preset room cleaning partitions which are divided successively have an adjacent relation, which is beneficial for improving the coverage rate of the cleaning area.

On the basis of the foregoing embodiment, the specific judgment method of the preset room cleaning partition includes: when the outline boundary line segments which define the initial room cleaning partition are not non-wall obstacle line segments, and the length of the isolated obstacle line segments in the initial room cleaning partition is smaller than the relatively small value in the length of the line segment corresponding to the number of the pixel points of the wall fitting quantity value and the preset ratio of the length of any side of the initial room cleaning partition, the size of the isolated obstacles in the framed closed area is not enough to form a wall, and the initial room cleaning partition is determined to be the preset room cleaning partition; when one of the outline boundary line segments which define the initial room cleaning partition is a non-wall obstacle line segment, or the length of an isolated obstacle line segment inside the initial room cleaning partition is greater than or equal to the length of a line segment corresponding to the number of the pixel points of the wall fitting quantity value, or the length of the isolated obstacle line segment inside the initial room cleaning partition is greater than or equal to a preset ratio of the length of one side of the initial room cleaning partition, it is determined that the initial room cleaning partition does not belong to the preset room cleaning partition; the outline boundary line segments are divided into non-wall obstacle line segments and wall obstacle line segments according to the number of white pixel points, the number of the white pixel points in the non-wall obstacle line segments is larger than or equal to a preset threshold value, and the number of the white pixel points in the wall obstacle line segments is smaller than a preset threshold value; isolated obstacle line segments also exist in the laser map, when the length of the isolated obstacle line segment is greater than or equal to one of a preset error ratio of the length of one side of the initial room cleaning partition and the length of the line segment corresponding to the number of the pixel points of the wall fitting number value, the isolated obstacle line segment is marked as the wall obstacle line segment. According to the embodiment, the environmental characteristics of the preset room cleaning partitions are determined by framing the line segment length properties of the outline boundary line segments of the initial room cleaning partitions and the length of the isolated obstacle line segments in the initial room cleaning partitions, the interference effect of obstacle straight lines in other areas is eliminated, the isolated obstacle line segments with non-negligible length are fitted into a physical wall, the influence of mistaken judgment of the outline boundary line segments into the wall is reduced, that the outline boundary positions of the preset room cleaning partitions constructed indoors are close to the wall is ensured, the divided preset room cleaning partitions can form a room area in the actual home environment.

The logic and/or steps represented in the flowcharts or otherwise described herein, such as an ordered listing of executable instructions that can be considered to implement logical functions, can be embodied in any computer-readable medium for use by or in connection with an instruction execution system, apparatus, or device, (such as a computer-based system, processor-containing system, or other system that can fetch the instructions from the instruction execution system, apparatus, or device and execute the instructions). For the purposes of this description, the "computer-readable medium" can be any apparatus that can contain, store, communicate, propagate, or transport the program for use by or in connection with the instruction execution system, apparatus, or device. More specific examples (a non-exhaustive list) of the computer-readable medium include the following: an electrical connection (electronic device) having one or more wires, a portable computer diskette (magnetic device), a Random Access Memory (RAM), a Read-Only Memory (ROM), an Erasable Programmable Read-Only Memory (EPROM or flash memory), an optical fiber device, and a portable Compact Disc Read-Only Memory (CDROM). In addition, the computer-readable medium can even be paper or another suitable medium upon which the program can be printed, as the program can be electronically captured, via for instance optical scanning of the paper or other medium, then compiling, interpreting or otherwise processing in a suitable manner if necessary, and then is stored in a computer memory.

A chip, which is internally provided with a control program, and the control program is configured to control a mobile robot to execute the cleaning partition planning method. It is to be understood that the embodiments of the clean partition planning method described herein can be implemented by hardware, software, firmware, middleware, microcode, or any combination thereof. For a hardware implementation mode, a processing unit can be implemented within one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a processor, a controller, a micro-controller, a microprocessor, other electronic units designed to perform the functions described herein, or a combination thereof. When the embodiments are implemented in software, firmware, middleware or microcode, program code or code segments, they can be stored in a machine-readable medium, such as a storage component.

A robot, which is provided with a laser sensor, and the robot is internally provided with the chip for configuring the robot to divide the preset room cleaning partition in the process of walking along the boundary. A complete global map does not needed to be prestored in advance, but the initial room cleaning partition of the robot is divided in real time in the predefined cleaning area according to map image pixel information obtained by laser scanning in the process of walking along the boundary, the initial room cleaning partition of the robot is expanded by repeated iterative processing of the wall boundary of the uncleaned area in the same predefined cleaning area.

The above embodiments are only for illustrating the technical idea and features of the invention, and the purpose is to enable those skilled in the art to understand the content of the invention and implement the invention accordingly, and not to limit the protection scope of the invention accordingly. All equivalent changes and modifications made according to the spirit of the invention should be covered in the protection scope of the invention.

The invention claimed is:

1. A cleaning partition planning method for a robot walking along the boundary, wherein the cleaning partition planning method is executed in a process of robot walking along the boundary and the method comprises the following steps:

S11, starting from a boundary walking starting point position of a robot, locating outline boundary line segments in each coordinate axis direction of a laser map according to pixel point statistical information of the laser map scanned by the robot in a currently framed predefined cleaning area, wherein the laser map is scanned and constructed in the process of the robot walking along the boundary;

S12, selecting the outline boundary line segment closest to a preset position from each coordinate axis direction to define a rectangular initial room cleaning partition;

S13, when the initial room cleaning partition does not belong to a preset room cleaning partition, selecting a coordinate axis direction for preferential expanding, deleting a non-wall obstacle line segment in the initial room cleaning partition, which is vertically located in the coordinate axis direction for preferential expanding, then expanding the initial room cleaning partition along the same coordinate axis direction, and then entering S14;

S14, judging whether an outline boundary line segment located in the coordinate axis direction for preferential expanding in S13 and adjacent to the non-wall obstacle line segment deleted in S13 is located in an uncleaned area in the currently framed predefined cleaning area or not, and judging whether the outline boundary line segment located in the coordinate axis direction intersects with remaining outline boundary line segments of the initial room cleaning partition and no preset room cleaning partition is formed or not is judged, and in a case that the outline boundary line segment located in the coordinate axis direction intersects with the remaining outline boundary line segments of the initial room cleaning partition and a preset room cleaning partition is formed, returning to S13 for continuing expanding in the coordinate axis direction currently selected;

when the outline boundary line segment located in the coordinate axis direction for preferential expanding in S13 and adjacent to the non-wall obstacle line segment deleted in S13 is not located in the uncleaned area in the currently framed predefined cleaning area, stopping expanding in the coordinate axis direction currently selected in S13, and returning, to S13 for selecting a coordinate axis direction with a lower expansion priority for expanding, so that the predefined cleaning area is divided into at least one the preset room cleaning partition by the outline boundary line segments which are corresponding;

wherein the non-wall obstacle line segment belongs to an outline boundary line segment but does not represent a wall, and the outline boundary line segments which defines the preset room cleaning partition are superposed with actual room boundary within a preset error allowable range; and the actual room boundary comprises a boundary of obstacles inside the preset room cleaning partition and/or a boundary of obstacles inside an actual boundary area.

2. The cleaning partition planning method according to claim 1, further comprising:

framing a predefined cleaning area by taking a planning starting point position as a center on the laser map scanned and constructed by the robot in real time, then selecting a boundary walking starting point position of a physical boundary closest to the currently framed predefined cleaning area, and controlling the robot to advance from the boundary walking starting point position to the physical boundary along a straight-line planning path until, the robot is configured to walk along the physical boundary;

wherein the physical boundary comprises a boundary of obstacles or wall within the predefined cleaning area;

and the planning, starting point position is a starting position of the robot within the currently framed predefined cleaning area.

3. The cleaning partition planning method according to claim 2, wherein when it is detected that the preset room cleaning partition conforming to the requirements is divided from the currently framed predefined cleaning area, controlling the robot to continue to walk along a boundary in the divided preset room cleaning partition, and when the robot finishes one round along the preset room cleaning partition and returns to the planning starting point position, controlling the robot to start to perform planned cleaning on the preset room cleaning partition, wherein the preset room cleaning partition surrounds the planning starting point position, a walking path of the robot from the planning starting point position to the boundary walking starting point position, and boundary path the robot has walked.

4. The cleaning partition planning method according to claim 2, wherein in the process of the robot walking along the boundary, when the robot divides one preset room cleaning partition, if it is judged that the robot has walked out of the preset room cleaning partition divided at the boundary walking starting point position in a manner of along the boundary, controlling the robot to continue to divide a new preset room cleaning partition, then combining two preset room cleaning partitions, then controlling the robot to continue to walk along a boundary in a combined preset room cleaning partition, when the robot finishes one round along the boundary and returns to the planning starting point position, controlling the robot to perform planned cleaning on the combined preset room cleaning partition, wherein the combined preset room cleaning partition surrounds the planning starting position, a walking path of the robot from the planning starting point position to boundary walking starting point position, and the boundary path the robot has walked.

5. The cleaning partition planning method according to claim 3, wherein the robot is controlled not to cross the preset room cleaning partition in the process of executing the planned cleaning until the preset room cleaning partition is covered by a planned cleaning path, and then area covered by the robot cleaning is marked as a cleaned area, and meanwhile, scanned area outside the area covered by the robot cleaning is marked as an uncleaned area.

6. The cleaning partition planning method according to claim 3, wherein the predefined cleaning area is a square block area with the planning starting point position as a diagonal intersection point, and is configured to limit a range of the robot walking along the boundary, so as to surround a preset room cleaning partition determined at current time or a preset room cleaning partitions combined in the same predefined cleaning area; and
   a coverage area of the predefined cleaning area is equivalent to a square actual physical area, and side length of the square actual physical area is related to size of an area to be cleaned in a room.

7. The cleaning partition planning method according to claim 6, wherein the specific judgment method of the preset room cleaning partition comprises:
   when the outline boundary line segments which define the initial room cleaning partition are not non-wall obstacle line segments, and length of the isolated obstacle line segments in the initial room cleaning partition is smaller than a relatively small value in length of the line segment corresponding to the number of the pixel points of the wall fitting quantity value and the preset ratio of length of any side of the initial room cleaning partition, determining that the initial room cleaning partition belongs to the preset room cleaning partition;
   when one of the outline boundary line segments which define the initial room cleaning partition is a non-wall obstacle line segment, or the length of the isolated obstacle line segment inside the initial room cleaning partition is greater than or equal to the length of the line segment corresponding to the number of the pixel points of the wall fitting quantity value, or the length of the isolated obstacle line segment inside the initial room cleaning partition is greater than or equal to a preset ratio of the length of one side of the initial room cleaning partition, determining that the initial room, cleaning partition does not belong to the preset room cleaning partition;
   wherein the outline boundary line segments are divided into non-wall obstacle line segments and wall obstacle line segments according to the number of white pixel points, the number of the white pixel points in the non-wall obstacle line segments is greater than or equal to a preset threshold value, and the number of the white pixel points, in the wall obstacle line segments is smaller than the preset threshold value; and
   wherein isolated obstacle line segments scanned also exist in the laser map, when the length of the isolated obstacle line segment is greater than or equal to one of the preset error ratio of length of one side of the initial room cleaning partition and the length of the line segment corresponding to the number of the pixel points of the wall fitting number value, the isolated obstacle line segment is marked as the wall obstacle line segment.

8. The cleaning partition planning method according to claim 7, wherein the specific method of S11 comprises:
   counting image pixel points of the laser map currently constructed from the planning starting point position in the predefined cleaning area;
   when, it is counted that the number of black pixel points with same vertical coordinate exceeds a preset boundary threshold value in the X-axis direction, marking the outline boundary line segments formed by connection of the black pixel points with the same vertical coordinate, so that area extending in the X-axis direction in the predefined cleaning area is divided by the corresponding outline boundary line, segments; and
   when it is counted that the number of black pixel points with same horizontal coordinate exceeds a preset boundary threshold value in the Y-axis direction, marking the outline boundary line segments formed by connection of the black pixel points with the same vertical coordinate, so that area extending in the Y-axis direction in the predefined cleaning area is divided by the corresponding outline boundary line segments.

9. A chip, internally provided with a control program, wherein the control program is configured to control a mobile robot to execute the cleaning partition planning method and the method comprises the following steps:
   S11, starting from a boundary walking starting point position of a robot, locating outline boundary line segments in each coordinate axis direction of a laser map according to pixel point statistical information of the laser map scanned by the robot in a currently framed predefined cleaning area, wherein the laser map is scanned and constructed in the process of the robot walking along the boundary;

S12, selecting the outline boundary line segment closest to a preset position from each coordinate axis direction to define a rectangular initial room cleaning partition;

S13, when the initial room cleaning partition does not belong to a preset room, cleaning partition, selecting a coordinate axis direction for preferential expanding, deleting a non-wall obstacle line segment in the initial room cleaning partition, which is vertically located in the coordinate axis direction for preferential expanding, then expanding the initial room cleaning partition along the same coordinate axis direction, and then entering S14;

S14, judging whether an outline boundary line segment located in the coordinate axis direction for preferential expanding in S13 and adjacent to the non-wall obstacle line segment deleted in S13 is located in an uncleaned area in the currently framed predefined cleaning area or not, and judging whether the outline boundary line segment located in the coordinate axis direction intersects with remaining outline boundary line segments of the initial room cleaning partition and no preset room cleaning partition is formed or not is judged, and in a case that the outline boundary line segment located in the coordinate axis direction intersects with the remaining outline boundary line segments of the initial room cleaning partition and a preset room cleaning partition is formed, returning to S13 for continuing expanding in the coordinate axis direction currently selected;

when the outline boundary line segment located in the coordinate axis direction for preferential expanding in S13 and adjacent to the non-wall obstacle line segment deleted in S13 is not located in the uncleaned area in the currently framed predefined cleaning area, stopping expanding in the coordinate axis direction currently selected in S13, and returning to S13 for selecting a coordinate axis direction with a lower expansion priority for expanding, so that the predefined cleaning area is divided into at least one the preset room cleaning partition by the outline boundary line segments which are corresponding;

wherein the non-wall obstacle line segment belongs to an outline boundary line segment but does not represent a wall, and the outline boundary line segments which defines the preset room cleaning partition are superposed with actual room boundary within a preset error allowable range; and the actual room boundary comprises a boundary of obstacles inside the preset room cleaning partition and/or a boundary of obstacles inside an actual boundary area.

10. A robot, provided with a laser sensor, wherein the robot is internally provided with the chip according to claim 9 or configuring the robot to divide the preset room cleaning partition in the process of walking along the boundary.

11. The cleaning partition planning method according to claim 4, wherein the robot is controlled not to cross the preset room cleaning partition in the process of executing the planned cleaning until the preset room cleaning partition is covered by a planned cleaning path, and then area covered by the robot cleaning is marked as a cleaned area, and meanwhile, scanned area outside the area covered by the robot cleaning is marked as an uncleaned area.

12. The cleaning partition planning method according to 4, wherein the predefined cleaning area is a square block area with the planning starting point position as a diagonal intersection point, and is configured to limit a range of the robot walking along the boundary, so as to surround a preset room cleaning partition determined at current time or a preset room cleaning partitions combined in the same predefined cleaning area; and a coverage area of the predefined cleaning area is equivalent to a square actual physical area, and side length of the square actual physical area is related to size of an area to be cleaned in a room.

13. The cleaning partition planning method according to claim 12, wherein the specific judgment method of the preset room cleaning partition comprises:

when the outline boundary line segments which define the initial room cleaning partition are not non-wall obstacle line segments, and length of the isolated obstacle line segments in the initial room cleaning partition is smaller than a relatively small value in length of the line segment corresponding to the number of the pixel points of the wall fitting quantity value and the preset ratio of length of any side of the initial room cleaning partition, determining that the initial room cleaning partition belongs to the preset room cleaning partition;

when one of the outline boundary line segments which define the initial room cleaning partition is a non-wall obstacle line segment, or the length of the isolated obstacle line segment inside the initial room cleaning partition is greater than or equal to the length of the line segment corresponding to the number of the pixel points of the wall.fitting quantity value, or the length of the isolated obstacle line segment inside the initial room cleaning partition is greater than or equal to a preset ratio of the length of one side of the initial room cleaning partition, determining that the initial room cleaning partition does not belong to the preset room cleaning partition;

wherein the outline boundary line segments are divided into non-wall obstacle line segments and wall obstacle line segments according to the number of white pixel points, the number of the white pixel points in the non-wall obstacle line segments is greater than or equal to a preset threshold value, and the number of the white pixel points in the wall obstacle line segments is smaller than the preset threshold value; and wherein isolated obstacle line segments scanned also exist in the laser map, when the length of the isolated obstacle line segment is greater than or equal to one of the preset error ratio of length of one side of the initial room cleaning partition and the length of the line segment corresponding to the number of the pixel points of the wall fitting number value, the isolated obstacle tine segment is marked as the wall obstacle line segment.

14. The cleaning partition planning method according to claim 13, wherein the specific method of S11 comprises:

counting image pixel points of the laser map currently constructed from the planning starting point position in the predefined cleaning area;

when it is counted that the number of black pixel points with same vertical coordinate exceeds a preset boundary threshold value in the X-axis direction, marking the outline boundary line segments formed by connection of the black pixel points with the same vertical coordinate, so that area extending in the X-axis direction in the predefined cleaning area is divided by the corresponding outline boundary line segments; and when it is counted that the number of black pixel points with same horizontal coordinate exceeds a preset boundary threshold value in the Y-axis direction, marking the outline boundary line segments formed by connection of the black pixel points with the same vertical coordinate, so that area extending in the Y-axis direction in the predefined cleaning area is divided by the corresponding outline boundary line segments.

15. The chip according to claim 9, further comprising: framing a predefined cleaning area by taking a planning starting point position as a center on the laser map scanned and constructed by the robot in real time, then selecting a boundary walking starting point position of a physical boundary closest to the currently framed predefined cleaning area, and controlling the robot to advance from the boundary walking starting point position to the physical boundary along a straight-line planning path until the robot is configured to walk along the physical boundary;
wherein the physical boundary comprises a boundary of obstacles or wall within the predefined cleaning area; and the planning starting point position is a starting position of the robot within the currently framed predefined cleaning area.

16. The chip according to claim 15, wherein when it is detected that the preset room cleaning partition conforming to the requirements is divided from the currently framed predefined cleaning area, controlling the robot to continue to walk along a boundary in the divided preset room cleaning partition, and when the robot finishes one round, along the preset room cleaning partition and returns to the planning starting point position, controlling the robot to start to perform planned cleaning on the preset room cleaning partition, wherein the preset room cleaning partition surrounds the planning starting point position, a walking path of the robot from the planning starting point position to the boundary walking starting point position, and boundary path the robot has walked.

17. The chip according to claim 15, wherein in the process of the robot walking along the boundary, when the robot divides one preset room cleaning partition, if it is judged that the robot has walked out of the preset room cleaning partition divided at the boundary walking starting point position in a manner of along the boundary, controlling the robot to continue to divide a new preset room cleaning partition, then combining two preset room cleaning partitions, then controlling the robot to continue to walk along a boundary in a combined preset room cleaning partition, when the robot finishes one round along the boundary and returns to the planning starting point position, controlling the robot to perform planned cleaning on the combined preset room cleaning partition, wherein the combined preset room cleaning partition surrounds the planning starting position, a walking path of the robot from the planning starting point position to boundary walking starting point position, and the boundary path the robot has walked.

18. The chip according to claim 16, wherein the robot is controlled not to cross the preset room cleaning partition in the process of executing the planned cleaning until the preset room cleaning partition is covered by a planned cleaning path, and then area covered by the robot cleaning is marked as, a cleaned area, and meanwhile, scanned area outside the area covered by the robot cleaning is marked as an uncleaned area.

19. The chip according to claim 16, wherein the predefined cleaning area is a square block area with the planning starting point position as a diagonal intersection point, and is configured to limit a range of the robot walking along the boundary, so as to surround a preset room cleaning partition determined at current time or a preset room cleaning partitions combined in the same predefined cleaning area; and
a coverage area of the predefined cleaning area is equivalent to a square actual physical area, and side length of the square actual physical area is related to size of an area to be cleaned in a room.

20. The chip according to claim 19, wherein the specific judgment method of the preset room cleaning partition comprises:
when the outline boundary line segments which define the initial room cleaning partition are not non-wall obstacle line segments, and length of the isolated obstacle line segments in the initial room cleaning partition is smaller than a relatively small value in length of the line segment corresponding to the number of the pixel points of the wall fitting quantity value and the preset ratio of length of any side of the initial room cleaning partition, determining that the initial room cleaning partition belongs to the preset room cleaning partition;
when one of the outline boundary line segments which define the initial room cleaning partition is a non-wall obstacle line segment, or the length of the isolated obstacle line segment inside the initial room cleaning partition is greater than or equal to the length of the line segment corresponding to the number of the pixel points of the wall fitting quantity value, or the length of the isolated obstacle line segment inside the initial room cleaning partition is greater than or equal to a preset ratio of the length of one side of the initial room cleaning partition, determining that the initial room cleaning partition does not belong to the preset room cleaning partition;
wherein the outline boundary line segments are divided into non-wall obstacle line segments and wall obstacle line segments according to the number of white pixel points, the number of the white pixel points in the non-wall obstacle line segments is greater than or equal to a preset threshold value, and the number of the white pixel points in the wall obstacle line segments is smaller than the preset threshold value; and
wherein isolated obstacle line segments scanned also exist in the laser map, when the length of the isolated obstacle line segment is greater than or equal to one of the preset error ratio of length of one side of the initial room cleaning partition and the length of the line segment corresponding to the number of the pixel points of the wall fitting number value, the isolated obstacle line segment is marked as the wall obstacle line segment.

\* \* \* \* \*